US009235322B1

(12) United States Patent
Croteau et al.

(10) Patent No.: US 9,235,322 B1
(45) Date of Patent: Jan. 12, 2016

(54) SYSTEMS, METHODS AND COMPUTER PROGRAM PRODUCTS FOR A CLOUD APPLICATION EDITOR

(71) Applicant: CA, Inc., Islandia, NY (US)

(72) Inventors: Beau Croteau, Bay Shore, NY (US); David S. Tyree, Denver, CO (US); Nathan J. Giardina, San Diego, CA (US); Robert Hucik, Simi Valley, CA (US)

(73) Assignee: CA, Inc., New York, NY (US)

( * ) Notice: Subject to any disclaimer, the term of this patent is extended or adjusted under 35 U.S.C. 154(b) by 318 days.

(21) Appl. No.: 13/791,978

(22) Filed: Mar. 9, 2013

(51) Int. Cl.
G06F 3/01 (2006.01)
G06F 3/0481 (2013.01)
G06F 3/00 (2006.01)

(52) U.S. Cl.
CPC .................................. G06F 3/04817 (2013.01)

(58) Field of Classification Search
None
See application file for complete search history.

(56) References Cited

U.S. PATENT DOCUMENTS

2002/0174416 A1* 11/2002 Bates et al. .................... 717/128
2011/0283194 A1* 11/2011 Chen et al. .................... 715/735
2012/0072910 A1* 3/2012 Martin et al. ..................... 718/1
2013/0054812 A1* 2/2013 DeCoteau ..................... 709/226
2013/0132875 A1* 5/2013 Allen et al. .................... 715/765
2013/0232498 A1* 9/2013 Mangtani et al. ............. 718/104
2013/0300747 A1* 11/2013 Wong et al. ................ 345/440.2
2013/0318240 A1* 11/2013 Hebert et al. ................. 709/226
2014/0047342 A1* 2/2014 Breternitz et al. ............ 715/735
2014/0047413 A1* 2/2014 Sheive et al. ................. 717/110
2014/0075413 A1* 3/2014 Binjrajka ...................... 717/121
2014/0108971 A1* 4/2014 No et al. ....................... 715/762
2014/0165060 A1* 6/2014 Muller et al. .................... 718/1

* cited by examiner

Primary Examiner — Amy Ng
Assistant Examiner — Toan Vu
(74) Attorney, Agent, or Firm — Myers Bigel Sibley & Sajovec, P.A.

(57) ABSTRACT

A graphic visualization layer in an interactive development environment is displayed and used to create an application on a node of a computer network. The graphic visualization layer includes graphical shapes manipulated by a user to generate program language code for lifecycle stages of the application. The graphical shapes include an application graphical shape representing the application, a resource graphical shape representing a resource for the application, an action graphical shape representing an action for the application and a task graphical shape representing a task of the action. A selection of the application graphical shape is received. An application value for the application is received in an entry field of the application graphical shape. Program language code is generated based on the selection of the application graphical shape and the application value. The program language code is executable to install the application on a node of the computer network.

17 Claims, 9 Drawing Sheets

700

702

```
app.resources(function(app, appData){
        app.request({ type:'tomcat', name:'Hudson', logs:[]});
});
app.on("install", function(app, appData){                    704
        app.allocateResources();
        var resource={"type":"tomcat","name":"Hudson","logs":[]};
        app.addVirtualHost(resource, "hudson","/");
        app.pushToNodesWith(resource, 'hudson.war', '/');
        app.shellOnNodesWith(resource,function(appData,shell){
                require('shelljs/global');
                exec( 'tomcat/bin/startup.sh');
        });
});
```

```
app.configOnNodesWith("tomcat",function(appData){
    ConfigFile.edit("tomcat/conf/server.xml",function(file){
        file.lineWith(/<Connector port="8080"/, function(line){
806 ⟶       line.replace("8080", appData.resources.tomcat_jira.ports["http port"].port);
        });
        file.lineWith(/<Connector port="8009" protocol="AJPV1.3" redirectPort="8443" URIEncoding="UTF-8" V>/, function(line){
            line.replace("8009", appData.resources.tomcat_jira.ports.ajp_port.port);
        });
        file.lineWith(/<Server port="8005" shutdown="SHUTDOWN">/, function(line){
            line.replace("8005", appData.resources.tomcat_jira.ports["control port"].port);
        });
        file.lineWith(/<Context path="" docBase="\${catalina.home}Vatlassian-jira"/,function(line){
            line.append('\n<Parameter name="jira.home" value="/home/'+appData.appKey+'/jira"/>');
        });                                                                    804 ⟶
    });
    ConfigFile.touch("jira/dbconfig.xml",
                '<?xml version="1.0" encoding="UTF-8"?>'+
                '<jira-database-config>'+
                '<name>defaultDS</name>'+
                '<delegator-name>default</delegator-name>'+
                '<database-type>mysql</database-type>'+
                '<schema-name></schema-name>'+
                '<jdbc-datasource>'+
                '<url>jdbc:mysql://'+appData.appKey+'_mysql_jira:3306/'+appData.appKey+'_jira?useUnicode=true&characterEncoding=utf8&sessionVariables=storage_engine=InnoDB</url>'+
                '<driver-class>com.mysql.jdbc.Driver</driver-class>'+
                '<username>'+appData.appKey+'</username>'+
                '<password></password>'+
                '<pool-size>15</pool-size>'+
                '<validation-query>select 1</validation-query>'+
                '</jdbc-datasource>'+
                '</jira-database-config>'
    );
    ConfigFile.edit("tomcat/conf/catalina.properties",function(file){
        file.setProperty("common.loader",function(prop){
            prop.append(",${catalina.base}/lib/ext/*.jar");
        });
    });
    ConfigFile.edit("tomcat/bin/startup.sh",function(file){
        file.lineWith(/\!VbinVsh/,function(line){
            line.append('\nexport JAVA_OPTS="$JAVA_OPTS -Xms512m -Xmx1224m -XX:MaxPermSize=256m"\n');
            line.append("\nexport PATH=/home/"+appData.appKey+"/jre1.6.0_32/bin:$PATH\n");
        });
    });
});
```

SYSTEMS, METHODS AND COMPUTER PROGRAM PRODUCTS FOR A CLOUD APPLICATION EDITOR

TECHNICAL FIELD

The present disclosure relates generally to computer networks, software applications and cloud computing networks.

BACKGROUND

Cloud computing allows applications to be executed on various computers or nodes of a computing network. Computer programmers write programs to build applications for nodes in a cloud network. Existing cloud platforms focus on machines and servers. Building an application for a cloud network requires a specific application configuration for a node, including the location and resources of the node. Application creation in this environment is not easily separated from the configuration and maintenance details. Having to program for specific application configurations adds an extra layer of complexity for the user and limits the ability to install and execute applications in a dynamic cloud environment.

BRIEF SUMMARY

According to an embodiment of the disclosure, a graphic visualization layer in an interactive development environment is displayed and used to create an application on a node of a computer network. The graphic visualization layer includes a plurality of graphical shapes that are manipulated by a user to generate program language code for lifecycle stages of the application. The graphical shapes include an application graphical shape representing the application and a resource graphical shape representing a resource for the application. The graphical shapes may further include an action graphical shape representing an action for the application and a task graphical shape representing a task of the action. A selection of the application graphical shape is received. An application value for the application is received in an entry field of the application graphical shape. Program language code is generated based on the selection of the application graphical shape and the application value. The program language code is executable to install the application on a node of the computer network.

According to a further embodiment of the disclosure, a selection of the resource graphical shape is received. The resource represented by the resource graphical shape is selected from a plurality of resources that are each used to prepare the node for a type of application. A resource value for the resource is received in an entry field of the resource graphical shape. The program language code is generated based further on the selection of the resource graphical shape and the resource value.

According to a further embodiment, a selection of the action graphical shape is received. An action value for the action is received in an entry field of the action graphical shape. A selection of the task graphical shape is received. A task value for the task is received in an entry field of the task graphical shape. The program language code is generated based further on the selection of the action graphical shape, the action value, the selection of the task graphical shape and the task value.

In another embodiment, the graphical shapes of the graphic visualization layer restrict users to a programming development sequence of first application, then resource, then action and then task.

In an embodiment, the application and resource graphical shapes are independent of a node configuration prior to execution. The application and resource graphical shapes may also be independent of an application configuration prior to execution.

In another embodiment, a debugging interface is displayed in the interactive development environment. A temporary installation of the application may be created. The debugging interface incrementally steps through the creating the temporary installation while displaying a result of a respective incremental step such that the user may verify operation of the application.

Some other embodiments are directed to related methods, systems and computer program products.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Embodiments of the present disclosure are illustrated by way of example and are not limited by the accompanying figures with like references indicating like elements.

FIG. 7 illustrates example code of an application programming language for a cloud network, according to various embodiments described herein;

FIG. 8 illustrates example code of an application programming language for a cloud network, according to various embodiments described herein;

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Figure 1:
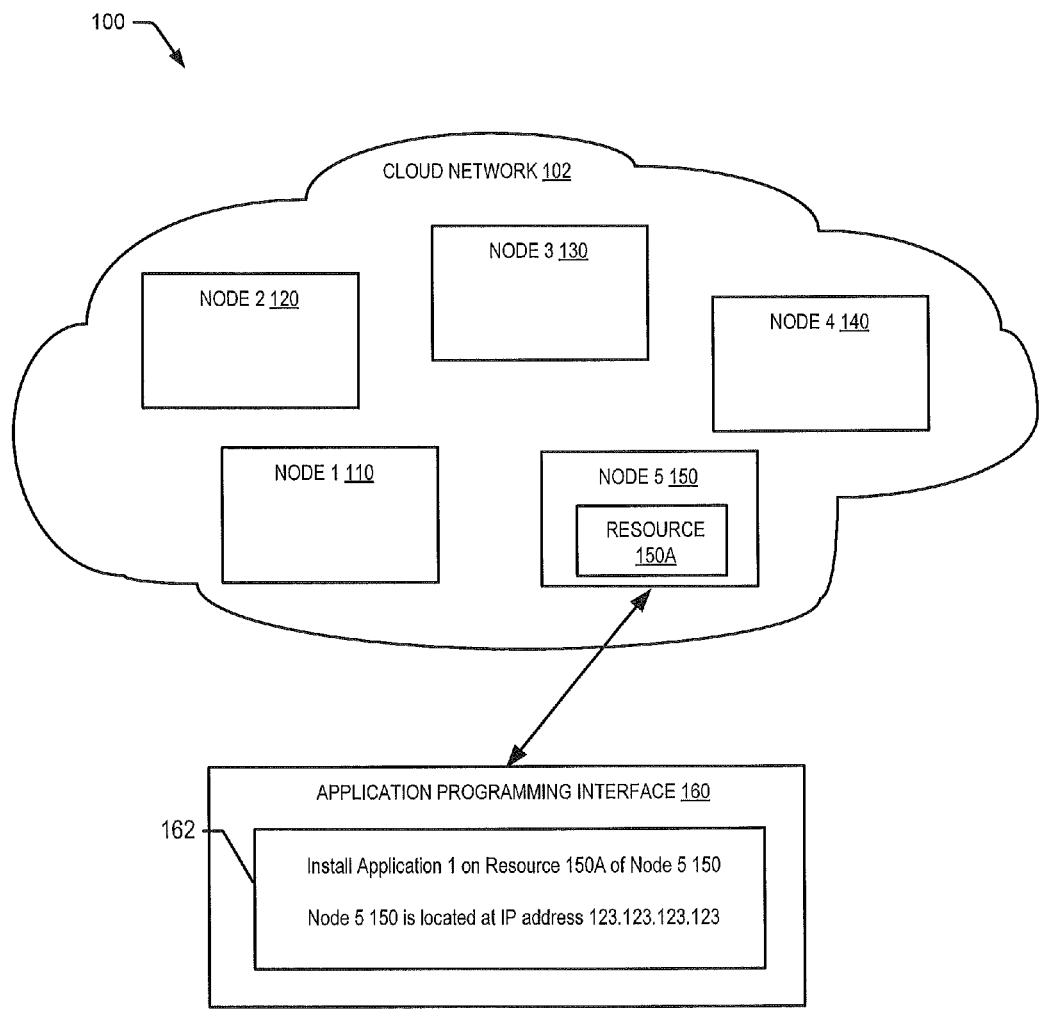
FIG. 1 illustrates an existing system for building an application for a cloud network.

Existing cloud platforms focus on machines and require an application configuration to be specified ahead of time before installation or execution of the application on a specified node. FIG. 1 shows system 100 with a cloud network 102 of nodes 1 to 5 (110-150). A typical application programming interface 160 is concerned with identifying the specific node to be utilized by an application. A user has to ask whether there is a machine with Resource 150A. Window 162 is focused on specifying, up front in the build programming language, application configuration information such as where the node is located and how the application will be configured with the resources of the node.

Application configurations usually involve preparing or allocating resources and configuring the application to use the resources. An application configuration may involve setting its name, creating a user, uploading a database, or other affirmative steps to prepare a specified node and its resources for an application. A typical installation may require downloading an application package, locating systems (database and web server) to install the package on, installing a database and web server software, installing the application package, configuring the application package and testing the installation. This adds complexity and additional hurdles for an application user or system administrator. A user may have an application the user wishes to create and would prefer a high-level, straightforward way to build the application and have it executed within a large and dynamic network of resources.

Various embodiments described herein provide an editor for a programming language for building, deploying, scaling, maintaining, and/or testing applications based in a cloud network, whether on-premise host computers and/or remote host computers. Applications may be written and built to be configured with resources in real time as a result of executing the programming language. At execution, application requirements and configuration steps may take advantage of information acquired from earlier configuration steps to make application configuration decisions. Examples of applications that may be built, configured, tested and executed include managed hosting applications such as Rackspace® applications, application services such as Amazon Web Services (AWS)® applications, portable development environments such as Vagrant® applications, debugging application such as Bugnet® applications, issue tracking application such as JIRA® applications, version control repositories such as Gitlab® applications, etc. In some regards, the programming language may be considered a Domain Specific Language (DSL) or a language created for a specific purpose.

Various embodiments described herein may be used for constructing cloud applications in a way that is technology agnostic. Technology is generally the foundation on which applications are built, but with various embodiments described herein, a user need not ask questions such as "Do I have a virtual machine with a MySQL® database on it?" or "Do I have one with Ruby on it?" Embodiments of the described declarative programming language can take care of these issues and cause a computer system or application manager to make relevant decisions for the programmer and/or user.

Embodiments of the described editor 240 for the declarative programming language allow a programmer and/or user to:

Create an Application;
Allocate Resources for that Application;
Perform Actions on that Resource;
Define Tasks to perform during those Actions;
Edit text and configuration files;
Perform command line actions;
Parameterize portions of the application for re-usability;
Test aspects of the overall application to ensure success and reachability; and
Utilize dynamic configuration data when needed.

There are many features of the language and editor described in the embodiments. From the viewpoint of the programmer, the language is server agnostic. The language may isolate the building of applications from understanding specific machines. It does not require that the programmer understand where resources, servers or virtual machines are currently allocated in order to define actions around all aspects of an application's life cycle.

Rather than specifying machines, a programmer can specify resources that will be used with the application. In many cases, the resources are necessary for an application. Resources can include, among others, a database (e.g., MySQL® database, MSSQL® database, PostreSQL® database), an application server (e.g., J2EE® server, Tomcat® server, NodeJS® server, Ruby on Rails® server) and/or other supporting infrastructure or services such as a message queue or a transaction server. The language, when executed, will utilize or allocate resources as necessary, depending on nodes that are available at the time of execution. This generates configuration information about those resources.

The programming language may use application configuration information that is stored or captured in a separate process to drive application configuration. For example, a virtual host may be allocated, setting up DNS and an HTTP proxy so the application can be reached by the world. Network ports can be allocated. A port can be reserved and saved in the application configuration file. Application configuration files can be modified using information from previous steps. Files can be copied to various resources. Shell code can be executed, often with application configuration information.

Some configuration information may be abstracted from installation information. If the application or same type of application is installed elsewhere, those instructions as to how to set up the same application package can be accessed at execution time and used for configuration.

Figure 2:
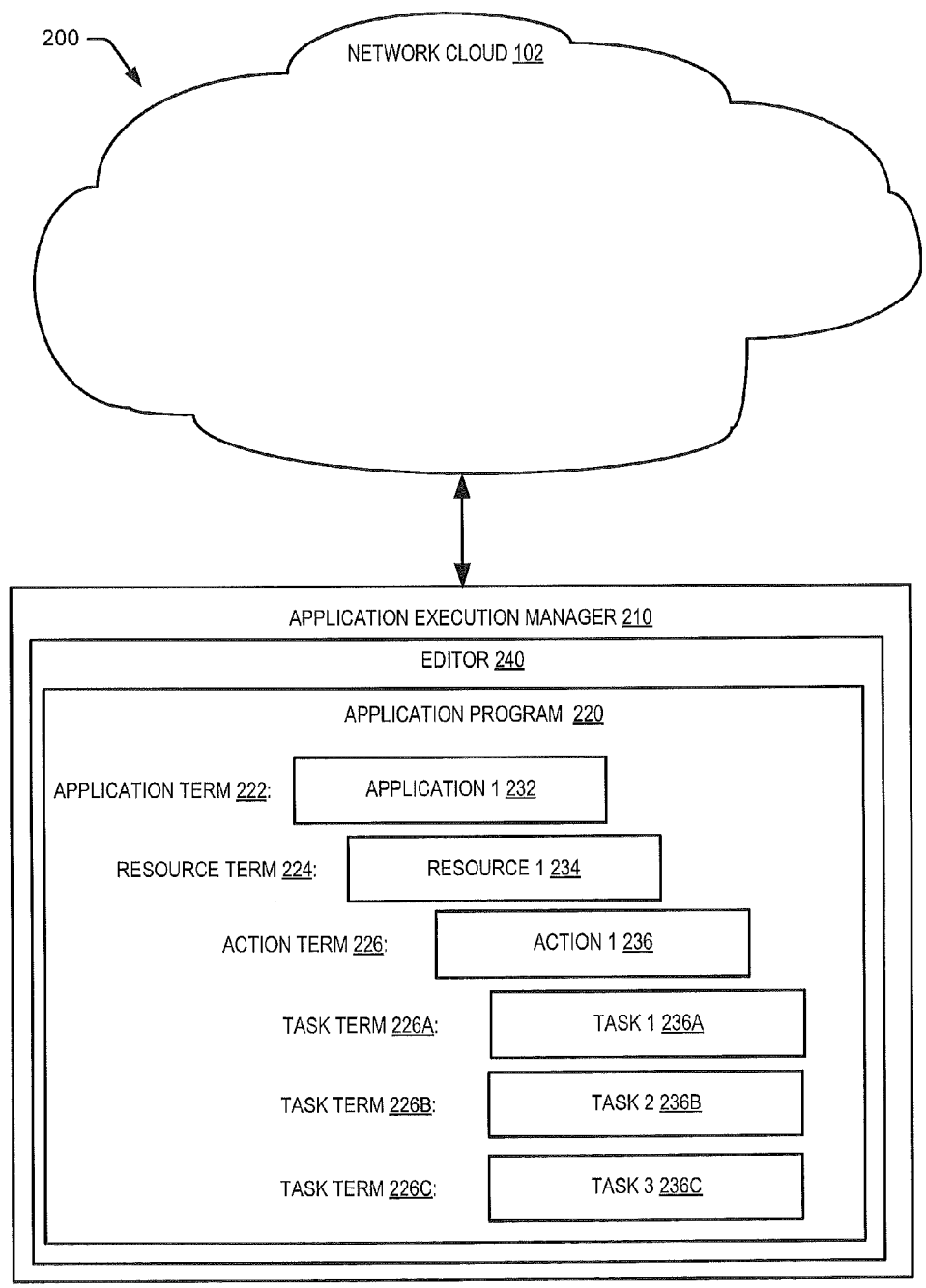
FIG. 2 illustrates a conceptual view of a system for providing an application programming language for a cloud network, according to various embodiments described herein.

FIG. 2 illustrates an exemplary system 200 of a computing environment involving cloud network 102. Cloud network 102 facilitates wireless or wired communication between computing devices, and may communicate using, for example, IP packets, Frame Relay frames, Asynchronous Transfer Mode (ATM) cells, voice, video, data, and other suitable information between network addresses. Cloud network 102 may include one or more local area networks (LANs), radio access networks (RANs), metropolitan area networks (MANS), wide area networks (WANs), virtual private networks (VPNs), a portion of the global computer network known as the Internet, and/or any other communication system or systems at one or more locations. In FIG. 1, cloud network 102 shows nodes 1-5 (110-150), but according to the programmer, it is just cloud network 102 in system 200 of FIG. 2.

According to the embodiment in FIG. 2, users and/or administrators may use application execution manager 210 to build, test, compile, install, execute and/or otherwise handle applications. Application execution manager 210 may be or may include an editor 240 with a user interface that functions as described in embodiments below. Application 1 232 may be built for installation or execution on nodes of cloud network 102 with application program 220. No application configuration is required to be specified in application program 220 prior to compilation and execution. Application execution manager 210 will associate an application configuration with Application 1 232 based on a selection from nodes 110-150 when application program 220 is executed. A node may be selected at or near the time of execution. According to some embodiments, installation details may be used to develop application configurations.

Each node may have certain resources prepared for the application. In some cases, resources may be allocated to selected nodes. These resources may also be specified in application program 220.

Application program 220 illustrates Application Term 222, which represents a language component used to build high level application object Application 1 232. Application 1 232 represents the application and the lifecycle of the application. One or more resources needed by the application, such as Resource 1 234, may be prepared for Application 1 232 using Resource Term 224. A resource may be a database and/or some software stack that provides functionality required by the application. At this time, no application configuration specific to a node is necessary. This can be advantageous as the nodes in a network or cloud and their configurations may change between now and the time of execution.

Next, actions can be defined for different lifecycle events, including but not limited to, install, uninstall, backup and/or restore. Action Term 226 may be used for creating Action 1 236. Within each action, various tasks can be defined, such as allocating a port, copying a file from the package file, executing a shell command, editing a file, etc. Task Terms 226A-C may be used to define Tasks 236A-C.

Figure 3:
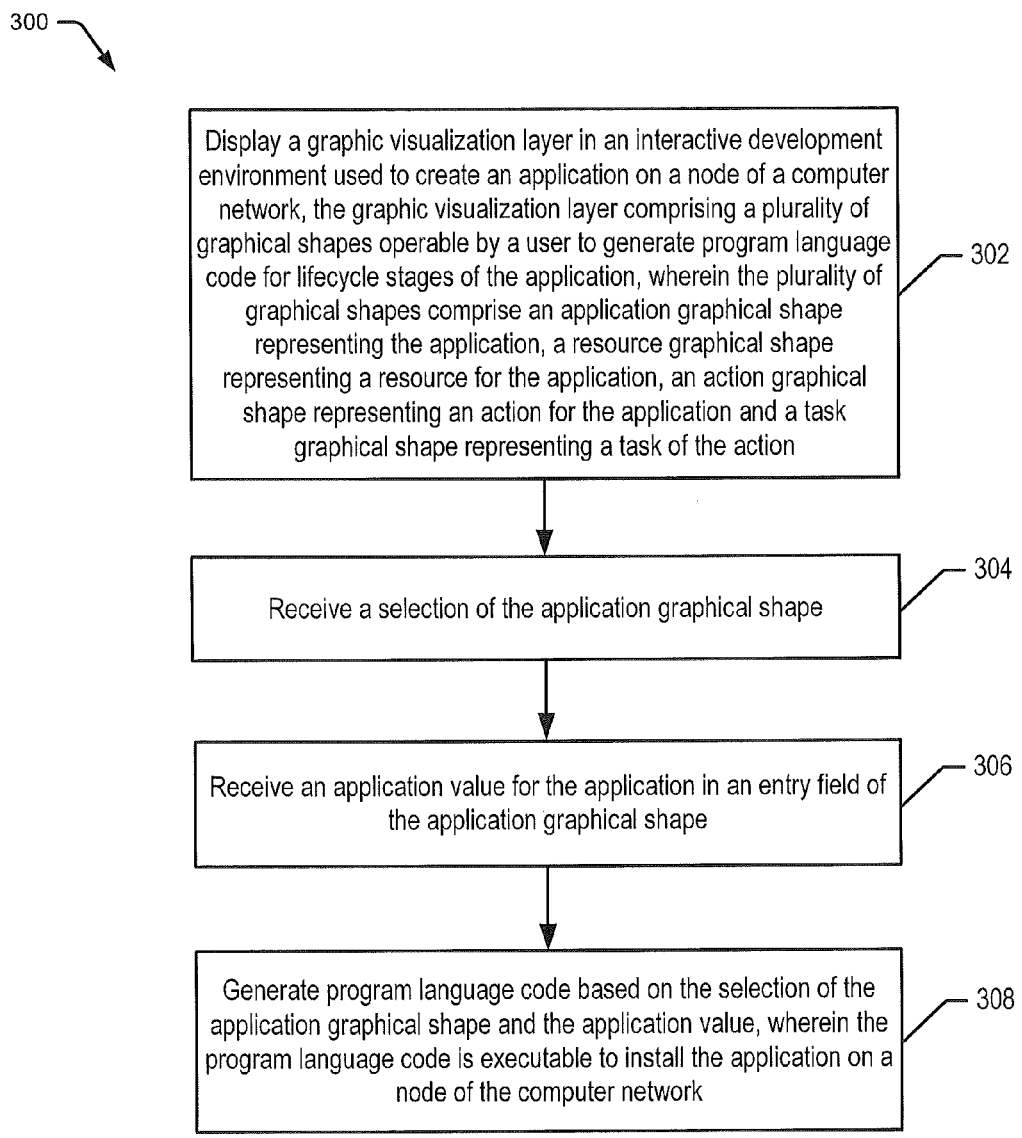
FIG. 3 illustrates a process for providing an application programming language for a cloud network, according to various embodiments described herein.

FIG. 3 shows a flowchart 300 for an editor, such as editor 240, for the application programming language that provides a user terms or graphical user interface components, according to an embodiment. In block 302, a graphic visualization layer in an interactive development environment used to create an application on a node of a computer network is displayed. The graphic visualization layer includes a plurality of graphical shapes that are manipulated by a user to generate program language code for lifecycle stages of the application. The graphical shapes may be rectangles, squares, circles, or any other shape or polygon representing a component of a program for any stage in a lifecycle of an application, including but not limited to, installing and/or executing an application on a node of cloud network 102. Example shapes are shown in FIG. 4.

Figure 4:
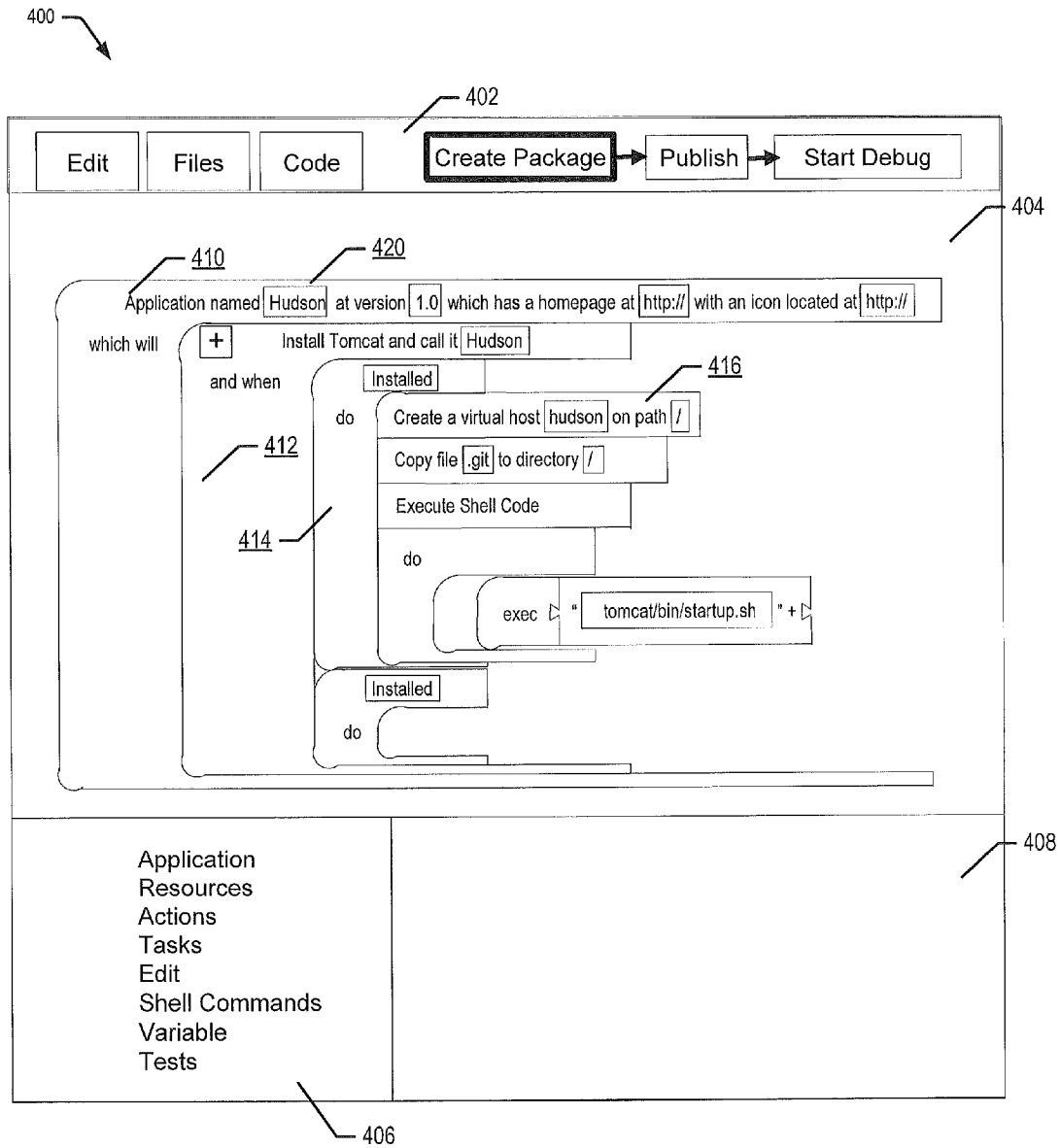
FIG. 4 illustrates a display view of an application programming language editor for a cloud network, according to various embodiments described herein.

The shapes illustrated in FIG. 4 are example graphical representations that represent programming terms and simplify programming an application for cloud network 102. Entry values may be entered at times, but large portions of textual coding are not necessary (although a user may switch to a code view of the program if the user desires). Less textual coding makes for a more user friendly tool. A user does not need to have a thorough knowledge of a programming language nor worry about perfect spelling and use of the programming keywords or syntax. In addition, the user does not need to have knowledge of the nodes or application configurations for the nodes in cloud network 102.

The graphical shapes may include an application graphical shape representing the application, a resource graphical shape representing a resource for the application, an action graphical shape representing an action for the application and a task graphical shape representing a task of the action. Graphical shapes may also be used for other aspects of developing a programming language.

FIG. 4 shows display view 400, according to various embodiments described herein. A menu bar, such as menu bar 402, may provide functions for selecting files. Menu bar 402 may provide for simple lookup and selection of files that may be used in an application package. Window 408 may show a file directory view that shows files that may be associated with the application. These files may be dragged into appropriate graphical shapes to point to them in the programming code. Window 408, or any other windows, may also be used to show code text, debugging steps or other editor information.

Menu bar 402 may be used for managing different stages of development. These stages of development may include, but are not limited to, creating a package for application creation, publishing a package, starting a debug process, stopping a debug process and/or any other stages.

Display window 404 shows an example program in editor 240, similar to application program 220 of FIG. 2. A selection of the application graphical shape is received (block 304). Application graphical shape 410 may represent application term 222. Application graphical shape 410 may be selected from a menu or some other repository or menu, such as menu 406. It may contain entry fields, such as entry field 420, where application values, such as application value 232 may be entered by the user and/or editor 240. An application value for the application is received in an entry field of the application graphical shape (block 306).

Application values may include a name for the application or application instance, a type of application, a version of the application, and/or a homepage or internet location of the application. Application values may also include other information that identifies how a user can find and use the application, absent of any application configuration details.

Program language code is generated based on the selection of the application graphical shape and the application value (block 308). The selection of the application graphical shape invokes an application term that is a syntax keyword of the program language code that is used to generate instructions to create and prepare the application according to any entered application values. The program language code places the entry values in the proper location in the program language code with respect to the application term. The program language code is executable to install the application on a node of the computer network.

A resource term of the declarative programming language is obtained for preparing a resource for the application. The resource term is independent of the application configuration prior to compilation of the resource term and the application configuration prepares the resource of a selected node of the node network for the application at execution time of the resource term. Resource preparation may involve allocating the resource to one or more nodes of the network.

Figure 6:
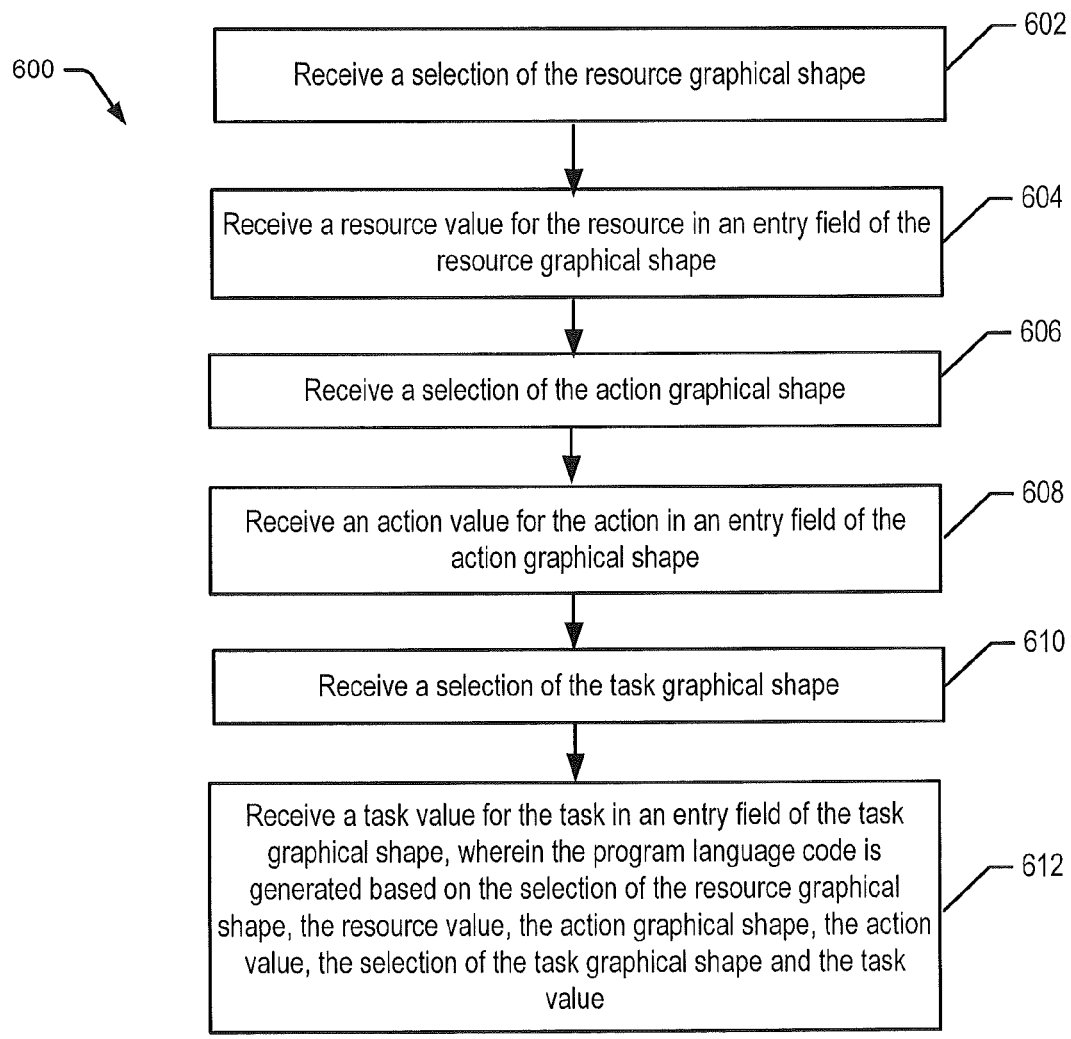
FIG. 6 illustrates a further process for providing an application programming language editor for a cloud network, according to various embodiments described herein.

FIG. 6 illustrates a flowchart 600 that shows a further process for using an editor, such as editor 240, for an application programming language. At block 602, a selection of a resource graphical shape 412 is received. Resource graphical shape 412 may represent resource term 224 of application program 220 of FIG. 2. The resource or resource term 224 represented by resource graphical shape 412 may be selected from a plurality of resources that are each used to prepare the node for a type of application. Different resources may be displayed in editor 240 and a resource selection may be selected from the displayed resources. For example, a web server resource may be selected over a database resource depending on the type of application. The user may be restricted to certain resources according to the application graphical shape selection or any values or information associated with the application represented by the application graphical shape. In some cases, multiple resources may be selected for one or more resource graphical shapes. Resource graphical shape 412 may also have entry fields to receive resource values, such as resource value 234 (block 604).

An action term of the declarative programming language is obtained for performing an action of the application. The action term is independent of the application configuration prior to compilation of the action term. Actions may be written before knowing the information from the application configuration.

A selection of an action graphical shape 414 is received (block 606). Action graphical shape 414 may represent action term 226 of application program 220. Action graphical shape 414 may also have entry fields to receive action values, such as action value 236 (block 608).

A task term of the declarative programming language is obtained for performing a task of the action, wherein the task term is independent of the application configuration prior to compilation of the task term. In most cases, a programming language includes an application term, one or more resource terms, one or more actions terms and one or more task terms associated with each action term. In some cases, any combination and/or subcombination of terms may be used.

A selection of a task graphical shape 416 is received (block 610). Task graphical shape 416 may represent task term 226A of application program 220. The task or task term 226A represented by task graphical shape 416 may be selected from a plurality of tasks that are each used to carry out the action for the application. As shown in FIG. 4, there are different types of tasks. Task graphical shape 416 may also have entry fields to receive task values, such as task value 236A (block 612). Multiple tasks may be used for an action. Multiple tasks are shown in FIG. 4 for the action represented by action graphical shape 414. Program language code is generated further based on the selection of the resource graphical shape, the resource value, the action graphical shape, the action value, the selection of the task graphical shape and the task value.

The resulting programming language code may be in a well known language code or scripting language code, such as JavaScript. In other cases, the programming language code may be a proprietary code. In various cases, the programming language code may serve the purpose of an application, an installation script, a response file, or any other useful application for a node of cloud network 102.

The programming language code, with its terms and corresponding values, may be compiled. Compilation may involve gathering terms and values into a program. This may be performed in real time as graphical shapes are set into place and values are entered. This may also take place at a defined time or by a defined action of the programmer. Compilation may also include generating code, such as a JavaScript program. In some cases, compilation may also include generating lower level code for execution.

The programming language code may also be executed. Execution may involve carrying out instructions according to compiled terms to build, install, carry out, update, modify and/or remove the application. Other application lifecycle operations not listed here may be performed for the application. The application configuration is associated with the application and the application is built on one or more nodes to be ready for use.

When the application term is executed, an application configuration is associated with the application at execution time. The application configuration configures the application for use on a selected node. The node and its configuration, such as IP address or DNS name, may be selected at execution time, without any such node information entered by the user prior to compilation and/or execution. The application configuration was also not specified in the programming language of the user. The application configuration is developed based on the selected node. This may involve details about the location of the node and resources on the node or resources to be allocated on the node.

Resources for the application may be prepared for the application at the time the resource term is executed. In many embodiments, resources are allocated to the selected node or nodes. Resources may be identified, configured and/or allocated as part of the application configuration. As the language proceeds step by step, the application configuration may build upon previous configuration steps. In some cases, values in later steps are replaced or filled with values from previous or earlier steps.

Figure 5:
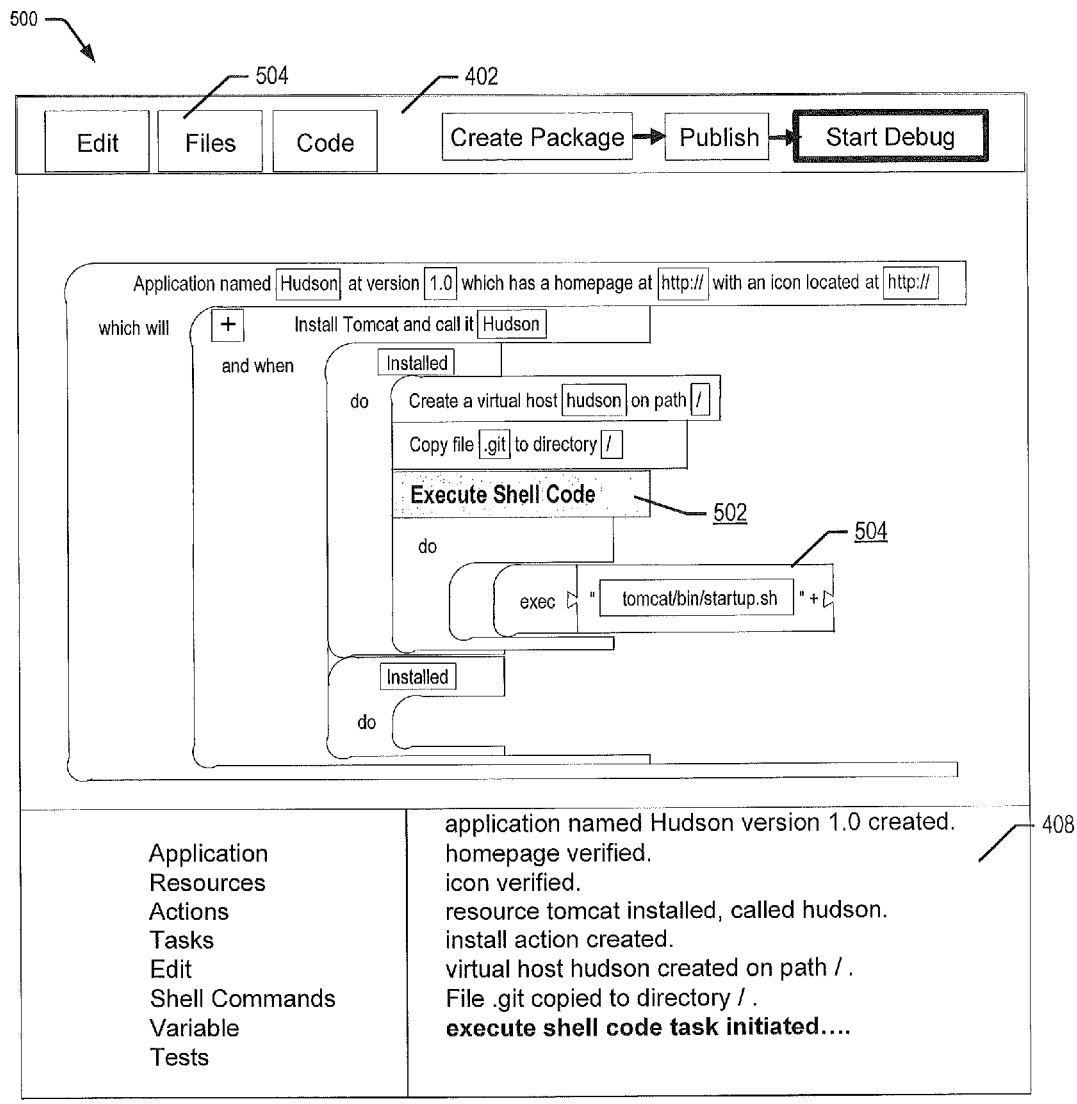
FIG. 5 illustrates another display view of an application programming language editor for a cloud network, according to various embodiments described herein.

Step by step procession of the language may be followed in the creation of a temporary installation of the application. For example, if debug mode of editor 240 is selected, incremental steps in the creation of the application may be performed under the control of the user. Window 408 of FIG. 5 shows messages or information related to successful (or unsuccessful) completion of the application build or package. In display view 500 of FIG. 5, the Execute Shell Code 502 is highlighted as this is the current step of the debugger. A related message is shown in bold in window 408. This step is initiating execution of the shell file specified in an entry field of task graphical shape 504. The debugger uses the temporary installation of the application to verify that this task will be successful in an actual instance of the application on a node of cloud network 102.

According to various embodiments described herein, the same program and its generated code may be executed by the same user twice or by two different users. The result will be separate instances of the application, whether on the same node or on different nodes. This illustrates the dynamic resource utilization of the application programming language. The programming language code is node agnostic. A node is selected and an application configured upon execution time. Therefore, the same or different nodes may be selected. However, from the user viewpoint, the user does not care as long as the application is created. Therefore, the user will find the simple, discrete tools and process of editor 240 advantageous.

The user may also benefit from any direction editor 240 provides to a user in the development process. In various embodiments, the user is restricted to a development process sequence of application term, resource term, action term and then task term. The user has to select the application graphical shape, and maybe enter the appropriate values in the prompted entry fields, before selection the resource graphical shape. In some cases, the user may not be restricted to the development sequence. However, such restrictions allow the user to avoid programming or structural mistakes. The graphical shapes may be designed to only fit or snap into other shapes a certain way based on the appropriate development sequence. The graphical shapes may limit the user to only valid steps.

As mentioned above, multiple application instances may exist on the same node. This is possible, in part, by dynamic application variables generated on a per-application basis. In an embodiment, an application key or appKey [A-Za-z0-9] is generated for each application. The application keys may be randomly generated. Application keys may be used to uniquely identify applications and instances of applications. Application keys isolate or shield applications from other applications. The application key described here allows you to introduce application specific values into your application configuration and as a result allows you to make generic what would otherwise be a static variable.

A unique application variable may be generated for the application at the execution time of the application term. The unique application variable introduces application specific values into the application configuration of the respective application on the selected node at the execution time of the application term. Application specific values can include the use of a resource name specified in the application installation step, the application key that was generated and the resource type based on the type of resource requested. An installation directory for the application may use the application key in naming. The user associated with the installation may also be named by the application key.

A second unique application variable may be generated for a second application on the selected node of a same type as the application and wherein the application and the second application may be executed on the selected node simultaneously.

In an embodiment, a database is created and named, perhaps with the application key (e.g., application key—specified database name—database type). This is a first piece of configuration information. This database would be allocated on a particular node. Application execution manager 210 may provide its own domain name service (DNS) infrastructure which will allow any application to ask for the IP address behind a named resource. When a DNS query is made for the named database, application execution manager 210 may respond with the IP address of the database server that the database is installed upon. This information may be stored in an application configuration record, which is a structure containing all configuration information that is known for a particular application.

Once the database is allocated, the application obtains instructions for how to use the database. The application configuration file is modified. In some cases, the application configuration file associated with the application is opened, a database connection string is searched and replaced with the database name (and port).

The language provides a template for the application execution manager 210 and/or editor 240 to follow to install an application. As the language is executed, various operations take place to generate configuration information, which is then used to fill in data required for other operations in the execution of the application. Such as in the example above, until the database is allocated, the name of the database and how to communicate with it are missing. Allocating the database will produce sufficient information for the application configuration to configure the application for the database.

Embodiments of the described language are designed with re-usability and cleaner programming language statements in mind. In some embodiments, the language was designed from the ground up to provide command-line and web-based requests in almost the same syntax or manner. An example of the language is shown in example code 700 in FIG. 7.

In the example code 700, an application term 702 may be represented by the keyword "app", which creates the application object. No details of an application configuration need to be specified by the programmer. The language will create the configuration object ("appData" object in the example code) to contain the future application specific configuration data. Such configuration data may not be developed until execution time.

The application may need a resource prepared for an application of its type. A resource keyword such as resource term 704 may be used to prepare resources for use by an application. For example, "allocateResources" may be used with "pushToNodesWith" to prepare whatever nodes are capable or selected to utilize a specified resource. In a further embodiment, sample language 700 also allows execution on remote nodes using the resources selected so that applications can be executed in different execution contexts.

FIG. 8 shows another portion 800 of the programming language, according to an embodiment. The language as written in portion 800 is independent of an application configuration. In this example, language keyword term 802 "appData" is used to maintain application configuration data, but prior to compilation, there is no application configuration information to associate with the application. As nodes are selected and resources are allocated at execution time, application configuration information is developed in appData. The "line.replace" keyword term 806 replaces placeholder values with application configuration information, which appData helps to collect and maintain. When the application object is populated with the node, resource and configuration information obtained at execution time, the application configuration is associated with the application.

Keyword term 804 or "appKey" represents an application key to be generated for this application so that it is isolated from other applications of the same type. This provides for multi-tenant configurations. Applications may be the same type but are allowed to coexist on the same operating system. Application keys are examples of unique identifiers that isolate each application from each other.

In an embodiment, editor 240 may operate through a browser on a node or computing device. The browser may be any commonly used browser, including any multithreading browser.

As will be appreciated by one skilled in the art, aspects of the disclosure may be embodied as a method, data processing system, and/or computer program product. Furthermore, embodiments may take the form of a computer program product on a tangible computer readable storage medium having computer program code embodied in the medium that can be executed by a computing device.

Figure 9:
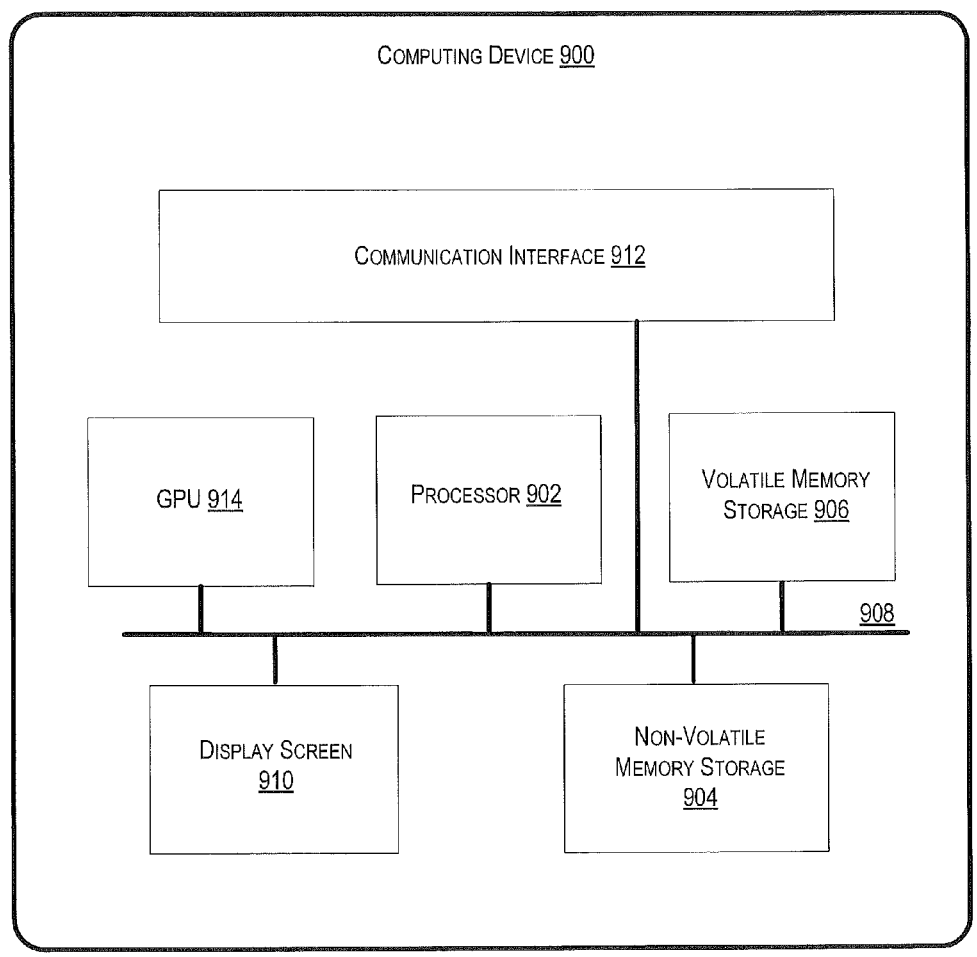
FIG. 9 is a block diagram of a computing device in which embodiments can be implemented.

FIG. 9 is an example computer system 900 in which embodiments of the present disclosure, or portions thereof, may be implemented as computer-readable code. For example, the components of application program 220, application execution manager 210, editor 240 or any other components of systems 200, 400-500 and 700-800 or methods 300 and 600 may be implemented in one or more computer devices 900 using hardware, software implemented with hardware, firmware, tangible computer-readable storage media having instructions stored thereon, or a combination thereof and may be implemented in one or more computer systems or other processing systems. Computer devices 900 may also be virtualized instances of computers. Components and methods in FIGS. 2-8 may be embodied in any combination of hardware and software.

Computing device 900 may include one or more processors 902, one or more non-volatile storage mediums 904, one or more memory devices 906, a communication infrastructure 908, a display screen 910 and a communication interface 912. Computing device 900 may also have networking or communication controllers, input devices (keyboard, a mouse, touch screen, etc.) and output devices (printer or display).

Processor(s) 902 are configured to execute computer program code from memory devices 904 or 906 to perform at least some of the operations and methods described herein, and may be any conventional or special purpose processor, including, but not limited to, digital signal processor (DSP), field programmable gate array (FPGA), application specific integrated circuit (ASIC), and multi-core processors.

GPU 914 is a specialized processor that executes instructions and programs, selected for complex graphics and mathematical operations, in parallel.

Non-volatile storage 904 may include one or more of a hard disk drive, flash memory, and like devices that may store computer program instructions and data on computer-readable media. One or more of non-volatile storage device 904 may be a removable storage device.

Memory devices 906 may include one or more volatile memory devices such as but not limited to, random access memory. Communication infrastructure 908 may include one or more device interconnection buses such as Ethernet, Peripheral Component Interconnect (PCI), and the like.

Typically, computer instructions are executed using one or more processors 902 and can be stored in non-volatile storage medium 904 or memory devices 906.

Display screen 910 allows results of the computer operations to be displayed to a user or an application developer.

Communication interface 912 allows software and data to be transferred between computer system 900 and external devices. Communication interface 912 may include a modem, a network interface (such as an Ethernet card), a communications port, a PCMCIA slot and card, or the like. Software and data transferred via communication interface 912 may be in the form of signals, which may be electronic, electromagnetic, optical, or other signals capable of being received by communication interface 912. These signals may be provided to communication interface 912 via a communications path. The communications path carries signals and may be implemented using wire or cable, fiber optics, a phone line, a cellular phone link, an RF link or other communications channels. According to an embodiment, a host operating system functionally interconnects any computing device or hardware platform with users and is responsible for the management and coordination of activities and the sharing of the computer resources.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, JavaScript, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Aspects of the present disclosure are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described exemplary embodiments or any actual software code with the specialized control of hardware to implement such embodiments, but should be defined only in accordance with the following claims and their equivalents.

What is claimed is:

1. A computer-implemented method comprising:
    displaying a graphic visualization layer in an interactive development environment used to create an application on a node of a computer network, the graphic visualization layer comprising a plurality of graphical shapes that are manipulated by a user to generate program language code, wherein the plurality of graphical shapes comprise:
        an application graphical shape representing the application and comprising an application value entry field;
        a resource graphical shape representing a resource for the application and comprising a resource value entry field;
        an action graphical shape representing an action for the application and comprising an action value entry field; and
        a task graphical shape representing a task of the action and comprising a task value entry field;
    receiving a selection of the application graphical shape;
    receiving an application value for the application in the application value entry field of the application graphical shape;
    receiving a selection of the resource graphical shape, wherein the resource represented by the resource graphical shape is selected from a plurality of resources that are each used to prepare the node for a type of application;
    receiving a resource value for the resource in the resource value entry field of the resource graphical shape;
    receiving a selection of the action graphical shape;
    receiving an action value for the action in the action value entry field of the action graphical shape;
    receiving a selection of the task graphical shape;
    receiving a task value for the task in the task value entry field of the task graphical shape; and
    generating program language code based on the selection of the application graphical shape, the application value, the selection of the resource graphical shape, the resource value, the selection of the action graphical shape, the action value, the selection of the task graphical shape, and the task value, and wherein the program language code is executable to install the application on the node.

2. The method of claim 1, wherein the task represented by the task graphical shape is selected from a plurality of tasks that are each used to carry out the action for the application.

3. The method of claim 1, wherein the graphical shapes of the graphic visualization layer restrict users to a programming development sequence of application, resource, action and task by restricting the interconnection of one shape to another shape within the graphical virtualization layer based on the respective graphical shape.

4. The method of claim 1, wherein the application and resource graphical shapes are independent of a node configuration prior to execution of the generated program language code.

5. The method of claim 1, wherein the application and resource graphical shapes are independent of an application configuration prior to execution of the generated program language code.

6. The method of claim 1, further comprising:
    displaying a debugging interface in the interactive development environment; and
    creating a temporary installation of the application, wherein the debugging interface incrementally steps through creation of the temporary installation while displaying a result of a respective incremental step.

7. The method of claim 1, wherein the program language code is capable of creating separate applications without modification of the program language code.

8. A system, comprising:
    a processor; and
    a memory coupled to the processor and comprising computer readable program code embodied in the memory that when executed by the processor causes the processor to perform operations comprising:
        displaying a graphic visualization layer in an interactive development environment used to create an application on a node of a computer network, the graphic visualization layer comprising a plurality of graphical shapes that are manipulated by a user to generate program language code, wherein the plurality of graphical shapes comprises:
- an application graphical shape representing the application and comprising an application value entry field;
- a resource graphical shape representing a resource for the application and comprising a resource value entry field;
- an action graphical shape representing an action for the application and comprising an action value entry field; and
- a task graphical shape representing a task of the action and comprising a task value entry field;

receiving a selection of the application graphical shape;
receiving an application value for the application in the application value entry field of the application graphical shape;
receiving a selection of the resource graphical shape, wherein the resource represented by the resource graphical shape is selected from a plurality of resources that are each used to prepare the node for a type of application;
receiving a resource value for the resource in the resource value entry field of the resource graphical shape;
receiving a selection of the action graphical shape;
receiving an action value for the action in the action value entry field of the action graphical shape;
receiving a selection of the task graphical shape;
receiving a task value for the task in the task value entry field of the task graphical shape; and
generating program language code based on the selection of the application graphical shape, the application value, the selection of the resource graphical shape, the resource value, the selection of the action graphical shape, the action value, the selection of the task graphical shape, and the task value, and wherein the program language code is executable to install the application on the node.

9. The system of claim 8, wherein the graphical shapes of the graphic visualization layer restrict users to a programming development sequence of application, resource, action and task by restricting the interconnection of one shape to another shape within the graphical virtualization layer based on the respective graphical shape.

10. The system of claim 8, wherein the application and resource graphical shapes are independent of a node configuration and application configuration prior to execution of the generated program language code.

11. The system of claim 8, the operations further comprising:
- displaying a debugging interface in the interactive development environment; and
- creating a temporary installation of the application, wherein the debugging interface incrementally steps through creation of the temporary installation while displaying a result of a respective incremental step.

12. A computer program product, comprising:
a non-transitory computer readable storage medium having computer readable program code embodied in the medium that when executed by a processor causes the processor to perform operations comprising:
displaying a graphic visualization layer in an interactive development environment used to create an application on a node of a computer network, the graphic visualization layer comprising a plurality of graphical shapes that are manipulated by a user to generate program language code, wherein the plurality of graphical shapes comprises:
- an application graphical shape representing the application and comprising an application value entry field;
- a resource graphical shape representing a resource for the application and comprising a resource value entry field;
- an action graphical shape representing an action for the application and comprising an action value entry field; and
- a task graphical shape representing a task of the action and comprising a task value entry field;

receiving a selection of the application graphical shape;
receiving an application value for the application in the application value entry field of the application graphical shape;
receiving a selection of the resource graphical shape, wherein the resource represented by the resource graphical shape is selected from a plurality of resources that are each used to prepare the node for a type of application;
receiving a resource value for the resource in the resource value entry field of the resource graphical shape;
receiving a selection of the action graphical shape;
receiving an action value for the action in the action value entry field of the action graphical shape;
receiving a selection of the task graphical shape;
receiving a task value for the task in the task value entry field of the task graphical shape; and
generating program language code based on the selection of the application graphical shape, the application value, the selection of the resource graphical shape and the resource value, the selection of the action graphical shape, the action value, the selection of the task graphical shape, and the task value, and wherein the program language code is executable to install the application on the node.

13. The non-transitory computer readable storage medium of claim 12, wherein the task represented by the task graphical shape is selected from a plurality of tasks that are each used to carry out the action for the application.

14. The non-transitory computer readable storage medium of claim 12, wherein the graphical shapes of the graphic visualization layer restrict users to a programming development sequence of application, resource, action and task by restricting the interconnection of one shape to another shape within the graphical virtualization layer based on the respective graphical shape.

15. The non-transitory computer readable storage medium of claim 12, wherein the application and resource graphical shapes are independent of a node configuration and an application configuration prior to execution of the generated program language code.

16. The non-transitory computer readable storage medium of claim 12, further comprising computer readable program code causing the processor to perform:
- displaying a debugging interface in the interactive development environment; and
- creating a temporary installation of the application, wherein the debugging interface incrementally steps through creation of the temporary installation while displaying a result of a respective incremental step.

17. The non-transitory computer readable storage medium of claim 12, wherein the program language code is capable of creating separate applications without modification of the program language code.

* * * * *